United States Patent
Ramanath

(10) Patent No.: US 7,835,574 B2
(45) Date of Patent: Nov. 16, 2010

(54) SYSTEM AND METHOD TO GENERATE MULTIPRIMARY SIGNALS

(75) Inventor: Rajeev Ramanath, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1130 days.

(21) Appl. No.: 11/403,493

(22) Filed: Apr. 13, 2006

(65) Prior Publication Data
US 2007/0242289 A1    Oct. 18, 2007

(51) Int. Cl.
*G06K 9/00* (2006.01)
(52) U.S. Cl. .................. 382/167; 382/162; 382/305
(58) Field of Classification Search ............. 382/162, 382/167, 305; 358/1.9, 518; 348/E9.047; 359/292; 345/84, 85, 502, 505
See application file for complete search history.

(56) References Cited

U.S. PATENT DOCUMENTS

| | | | | |
|---|---|---|---|---|
| 5,515,076 | A * | 5/1996 | Thompson et al. | 345/505 |
| 7,474,303 | B2 * | 1/2009 | Shin et al. | 345/204 |

OTHER PUBLICATIONS

Morovic, J., et al., "The Fundamentals of Gamut Mapping: A Survey," http://www.colour.org/tc8-03/survey/fund_gm.pdf, downloaded Apr. 7, 2006, 36 pp., Kingsway House, Kingsway, Derby, UK.

Ok, H.W., et al., "Color Processing for Multi-Primary Display Devices," IEEE International Conference on Image Processing, 2005, pp. 980-983, vol. 3, IEEE, Los Alamitos, CA.

* cited by examiner

*Primary Examiner*—Anh Hong Do
(74) *Attorney, Agent, or Firm*—Charles A. Brill; Wade James Brady, III; Frederick J. Telecky, Jr.

(57) ABSTRACT

System and method for generating multiprimary signals for use in display devices. A preferred embodiment comprises converting a color signal into an intermediate color space representation of the color signal, converting one of a plurality of multiprimary signals that is a representation of the color signal into an intermediate color space representation of the multiprimary signal, computing a quality measure of the intermediate color space representations of the color signal and the multiprimary signal, repeating the converting of a multiprimary signal and the computing for the remainder of the plurality of multiprimary signals, and selecting a multiprimary signal that optimizes the quality measure. The quality measure can consider requirements such as those minimizing a distance between the color signal and the multiprimary signal, an energy change as well as a phase change between the multiprimary signal and its neighbors, all leading to improved image quality.

10 Claims, 3 Drawing Sheets

SYSTEM AND METHOD TO GENERATE MULTIPRIMARY SIGNALS

TECHNICAL FIELD

The present invention relates generally to a system and a method for displaying images, and more particularly to a system and a method for generating multiprimary signals for use in display devices.

BACKGROUND

Video input to a typical display system is usually in the form of stimuli containing three driving signals, such as luminance-bandwidth-chrominance (YUV), luminance-chroma (blue)-chroma (red) (YCbCr), analog version of YCbCr (YPbPr), red-green-blue (RGB), and so forth. The stimuli with three driving signals can be expressed as three-dimensional color vectors. However, many display systems are multiprimary and use stimuli with, in general, N driving signals, where N is greater than or equal to three. Therefore, there is a need to convert the stimuli with three driving signals (the video input) into the stimuli with N driving signals used by the multiprimary display system.

With reference now to FIG. 1, there is shown a diagram illustrating a typical data flow 100 in a prior art technique for use in the conversion of stimuli with three driving signals (commonly presented as three-dimensional color vectors) into stimuli with N driving signals (N-dimensional color vectors) for use in a multiprimary display system. The prior art technique receives as input, the stimuli in the form of three-dimensional color vectors (denoted t), which can be converted into an intermediate color vector via a gamut mapping operation (block 105). The intermediate color vectors are in an intermediate common connection color space and must then be converted into the desired N-dimensional color vectors (denoted p) (block 110). The conversion can be expressed as a multiplication of the desired N-dimensional color vector, p, with a color matrix (denoted A) with dimension 3×N, which contains tristimulus values of the display system. The relationship between t, A, and p can be expressed as $t=A*p$ or $p=A^{-1}*t$. The desired N-dimensional color vector can then be used by the multiprimary display system.

With reference now to FIG. 2, there is shown an x-y chromaticity chart 200. The x-y chromaticity chart 200 illustrates a two-dimensional map of visible colors (shown as curve 205). In addition, the x-y chromaticity chart 200 illustrates displayable colors for an exemplary five-primary display system (shown as pentagram 210) with primary colors blue, yellow, cyan, red, and green, for example, as well displayable colors for an exemplary three-primary display system (shown as triangle 215) with primary colors red, green, and blue, for example. Consider a point inside the triangle 215 (shown as point C) that can be expressed as a combination of three weights (one for each color), such as $C=W_R*C_R+W_G*C_G+W_B*C_B$, where $C_R$, $C_G$, and $C_B$ denote chromaticity points of red, green, and blue, respectively, and $W_R$, $W_G$, and $W_B$ denote the amount of each color needed to generate the point C. Points inside the pentagram 210 can similarly be expressed as a combination of five colors. In general, points in the triangle 215 or the pentagram 210 can be generated by a large number of combinations of weights. An exception can be points that are in the pentagram 210 that are relatively close to the edge of the pentagram 210, such as point B, for example. Point B is close to a vertex of the pentagram 210 that represents pure cyan. The number of combinations that can generate the point B can be fewer than many other points within the pentagram 210 since the cyan primary has to be used in order to guarantee that the point B is placed at the proper point. This restriction reduces the number of possible combinations for the point.

For example, a pure yellow color can be generated as a combination of primaries (B=0, Y=0, C=0, R=255, G=255), or (B=0, Y=255, C=0, R=0, G=0), or (B=0, Y=255, C=0, R=255, G=0), or (B=0, Y=255, C=0, R=0, G=255), among others. Although many combinations can generate the same color, some combinations will be better than others. For example, some combinations may produce a brighter color than others. In a display system, increased brightness may be desired since image quality can be dependent upon image brightness. Additionally, some combinations may produce better results depending upon the chromatic characteristics of the display system. For example, combinations that minimize a transition of energy between primaries can produce images with a lower level of color noise.

One disadvantage of the prior art is that the prior art techniques compute an N-dimensional color vector that produces a color corresponding to a three-dimensional color vector without considering additional requirements on the selecting of the N-dimensional color vector that are realizable. Some of the N-dimensional color vectors, p, can have negative entries and more importantly, other N-dimensional vectors may improve image quality, such as minimize or eliminate color noise or reduce reproduction errors.

SUMMARY OF THE INVENTION

These and other problems are generally solved or circumvented, and technical advantages are generally achieved, by preferred embodiments of the present invention which provides a system and a method for generating multiprimary signals for use in display systems.

In accordance with a preferred embodiment of the present invention, a method for generating a multiprimary signal from a color signal with a smaller number of stimuli is provided. The method includes converting the color signal into an intermediate color space representation of the color signal and converting one of a plurality of multiprimary signals that is a representation of the color signal into an intermediate color space representation of the multiprimary signal. The method also includes computing a quality measure of the intermediate color space representations of the color signal and the multiprimary signal and then repeating the converting of a multiprimary signal and the computing for other multiprimary signals in the plurality of multiprimary signals. The method further including selecting the multiprimary signal that optimizes the quality measure.

In accordance with another preferred embodiment of the present invention, a method for displaying an image that is made up of multiple color signals is provided. The method includes receiving a color signal, retrieving a multiprimary signal corresponding to the color signal, where the multiprimary signal is stored in a memory of a system used to display the image. The method also includes displaying the multiprimary signal.

In accordance with another preferred embodiment of the present invention, a display system is provided. The display system includes an array of light modulators optically coupled to a light source, a controller coupled to the array of light modulators, and a memory coupled to the controller. The array of light modulators creates images by setting each light modulator in the array of light modulators into a state needed to properly display the image on a display plane, while the controller issues commands to control the operation of the array of light modulators. The memory stores multiprimary signals corresponding to color signals contained in the images being displayed. The multiprimary signals are selected from representative color signals and are selected prior to the manufacture of the display system.

An advantage of a preferred embodiment of the present invention is that requirements can be considered in the generation of N-dimensional color vectors from color vectors of smaller dimension. The requirements can be used to select N-dimensional color vectors that will produce images with better image quality and less color noise, for example. Furthermore, the chromatic characteristics of the display system can be considered in the generation of the N-dimensional color vectors.

A further advantage of a preferred embodiment of the present invention is that the generation of the N-dimensional color vectors from color vectors of smaller dimension utilizes a mapping that is smooth and piecewise continuous. This can yield a better conversion from color vectors of smaller dimension to color vectors of larger dimension.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a multiprimary microdisplay based display system that takes as input three-dimensional color vectors, wherein the microdisplay is a digital micromirror device (DMD). The invention may also be applied, however, to display systems using direct view liquid crystal displays, plasma displays, and so forth, or other microdisplay technologies, such as liquid crystal, liquid crystal on silicon, deformable mirror, and so forth. Furthermore, the present invention can be used in applications that need to generate N-dimensional color vectors from color vectors of smaller dimension, for example, from four-, five-, and so forth dimensional color vectors to N-dimensional color vectors.

Figure 1:
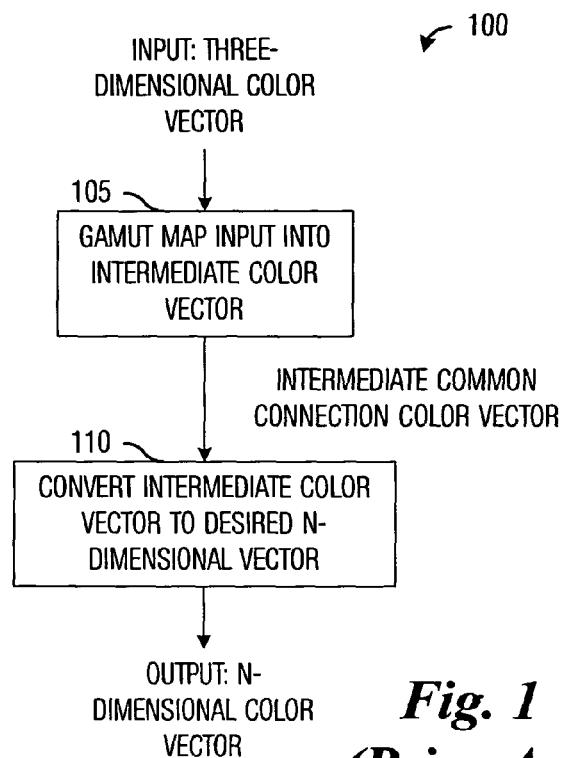
FIG. 1 is a prior art diagram of a technique for converting a three-dimensional color vector into a multiprimary color vector.
Figure 2:
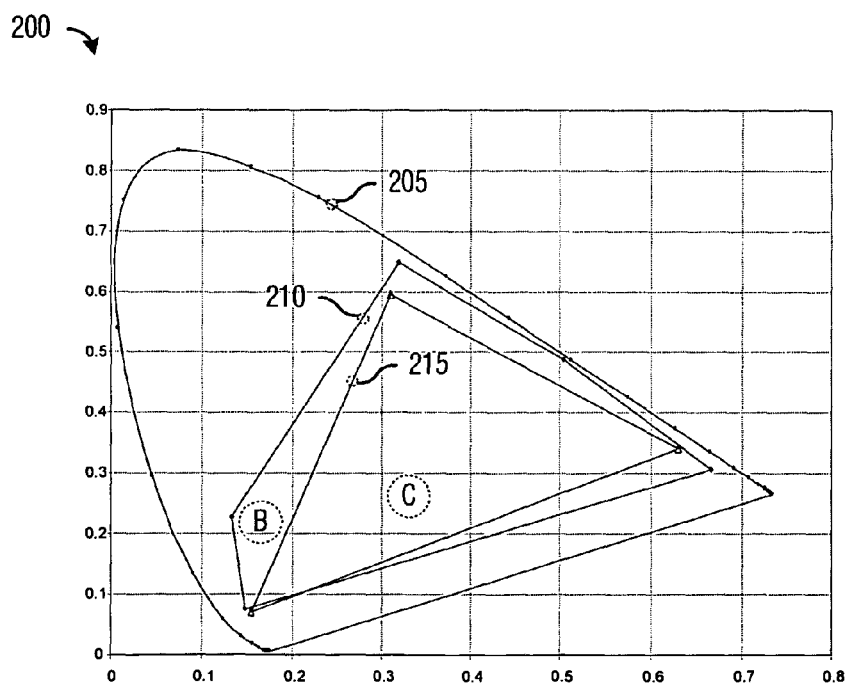
FIG. 2 is a diagram of a x-y chromaticity chart.
Figure 3:
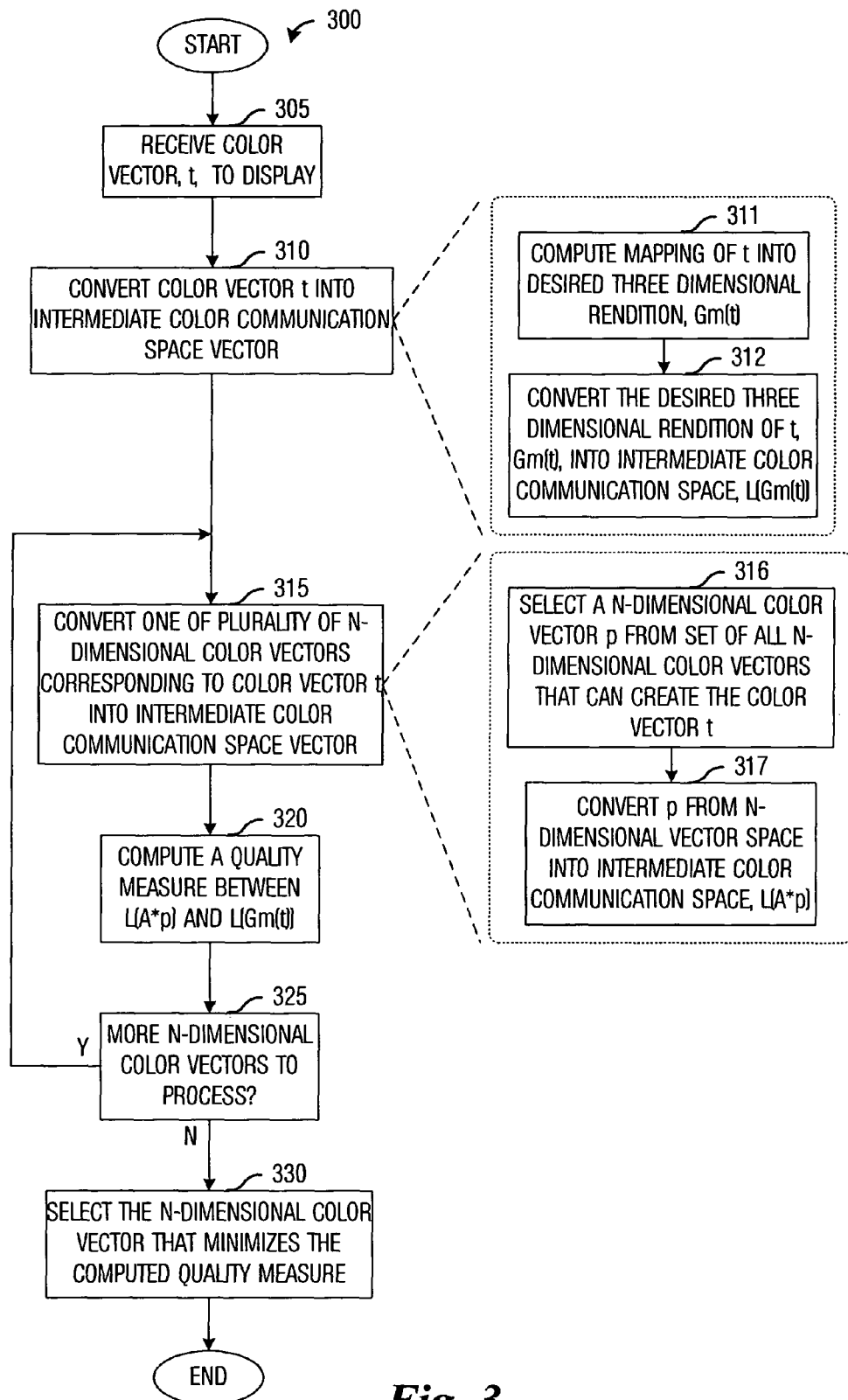
FIG. 3 is a diagram of an algorithm used in converting a three-dimensional color vector into an N-dimensional vector, according to a preferred embodiment of the present invention.

With reference now to FIG. 3, there is shown a diagram illustrating an algorithm 300 for use in converting a three-dimensional color vector into an N-dimensional vector, wherein N is greater than or equal to three, according to a preferred embodiment of the present invention. Although the description of the algorithm 300 discusses a three-dimensional input color vector, the algorithm 300 has applicability to input color vectors with dimension other than three. Therefore, if the input color vector is four-dimensional, then the value of N is then greater than or equal to four, for example. According to a preferred embodiment of the present invention, the algorithm 300 can be an application or program executing on a controller responsible for controlling the operation of the display system, where the controller can be a microcontroller, processing element, an application specific integrated circuit, a general purpose processing unit, and so forth. The algorithm 300 can also be implemented in firmware or hardware.

Upon receiving a color vector t to display (block 305), the controller will convert the color vector t into an intermediate color communication space color vector (block 310). According to a preferred embodiment of the present invention, the conversion of the color vector t, which is a three-dimensional color vector, for example, into an intermediate color communication space color vector includes a mapping of the color vector t into its desired three-dimensional rendition, $G_m(t)$ (block 311). A typical mapping involves a color gamut mapping process, which is considered to be well understood by those of ordinary skill in the art of the present invention. A survey of the fundamentals of gamut mapping is presented in a paper entitled "The Fundamentals of Gamut Mapping: A Survey," written by Jan Morovic and M. Ronnier Luo, which paper is hereby incorporated herein by reference. After mapping the color vector t into its desired three-dimensional rendition, the three-dimensional rendition of the color vector t, $G_m(t)$, can be converted into its intermediate color communication space equivalent, $L(G_m(t))$ (block 312). Preferably, the intermediate color communication space is a three-dimensional perceptual color space. The L(.) operation that converts the three-dimensional rendition of the color vector t, $G_m(t)$, into its intermediate color communication space equivalent is a representation in a common perceptual uniform color space, such as the CIE LAB or CIE LUV color spaces, for example. The CIE LAB or the CIE LUV are considered to be well understood by those of ordinary skill in the art of the present invention and will not be discussed herein.

The controller can convert a selected N-dimensional color vector p into its intermediate color communications space color vector equivalent (block 315). As discussed previously, a single three-dimensional color vector can typically be represented by a plurality of N-dimensional color vectors, with an actual number potentially being dependent upon the color vector's position in a chromaticity plot. For example, a color vector with a position closer to the middle of the chromaticity plot can be represented with a larger number of N-dimensional color vectors than a color vector with a position immediately adjacent to a boundary of the chromaticity plot.

According to a preferred embodiment of the present invention, the conversion of the selected N-dimensional color vector p into its intermediate color communication space color vector equivalent includes selecting an N-dimensional color vector p from a plurality of N-dimensional color vectors that are capable of representing the color vector t (block 316). After selecting the N-dimensional color vector p, the controller can convert the selected N-dimensional color vector p into its intermediate color communication space color vector equivalent, $L(A*p)$ (block 317).

The conversion of the color vector t and the N-dimensional color vector p into their intermediate color communication space color vector equivalents (blocks 310 and 315) can permit a direct comparison of the two color vectors. The controller can then compute a quality measure between the intermediate color communication space color vector equivalent of the color vector t, $(L(G_m(t)))$, and the intermediate color communication space color vector equivalent of the N-dimensional color vector p, $(L(A*p))$, that can be used to provide information regarding the quality of the match between the two vectors (block 320). According to a preferred embodiment of the present invention, the quality measure can be a simple squared norm of the difference between $L(A*p)$ and $L(G_m(t))$. An alternate difference may be a weighted difference that can scale the various components (such as lightness, chroma, hue, and so forth) of the intermediate color communication space color vector based on conventional color difference measures, which can have a greater impact on the overall quality of the images being displayed. Other quality measures are possible. A detailed discussion of several preferred quality measures is presented below.

After the quality measure has been computed, a check can be made by the controller to determine if there are more N-dimensional color vectors that should be processed (block 325). Since the computations performed by the controller can require a significant amount of processing power, a limit may need to be put on the number of N-dimensional color vectors that are processed. For example, if the controller has a limited amount of processing power or if the amount of time permitted to find a suitable N-dimensional color vector is limited, then the controller may be forced to process only a small number of N-dimensional color vectors. Once there are no more N-dimensional color vectors to process, the controller can select the N-dimensional color vector that had the best quality measure that was computed in block 320 (block 330). This N-dimensional color vector is the chosen N-dimensional color vector representing the color vector t. The algorithm 300 is a minimization algorithm that will minimize the quality measure computed in block 320 for the plurality of N-dimensional color vectors p. Alternatively, the algorithm 300 can be a maximization algorithm that will maximize a negative of the quality measure. Therefore, the algorithm 300 can be considered to be an optimization algorithm of the quality measure. The minimization performed by the algorithm 300 can be expressed as:

$$\arg\min_{p} \text{(quality measure)}.$$

Figure 4:
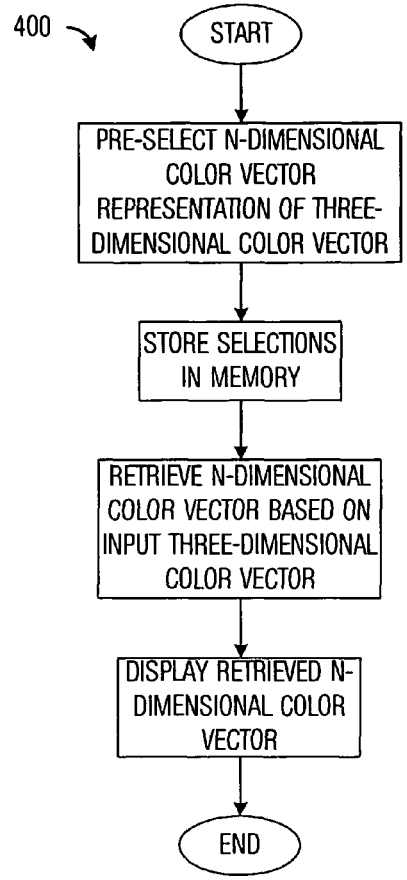
FIG. 4 is a diagram of a sequence of events in pre-selecting N-dimensional color vectors, according to a preferred embodiment of the present invention.

Depending upon the nature of the application as well as the capabilities of the controller, it may not be possible for the controller to select an N-dimensional color vector to represent the color vector t in the amount of time permitted to perform the selecting. For example, in a video display system, the selection will need to be performed in real-time and the controller may not have adequate processing power. Therefore, it is possible to pre-select the N-dimensional color vector representations for the color vectors that will be provided as an input to the display system and store the pre-selected N-dimensional color vectors in a memory. Then, when the display system receives a particular color vector t at its input, the controller of the display system can simply reference the memory and retrieve the pre-selected N-dimensional color vectors from storage. Depending upon the size of the memory, the pre-selection of the N-dimensional color vectors may be performed for all possible input color vectors. If the memory size is limited, then the pre-selection can be made for a selected number of input color vectors that are evenly distributed throughout an expected range of input color vectors, for example, and then processing can be added to correct for a difference between the actual input color vector and the one closest to it that is stored in the memory. A sequence of events 400 describing the pre-selection of N-dimensional color vector representations of input color vectors and then the use of the pre-selected N-dimensional color vector representations is shown in FIG. 4.

Figure 5A:
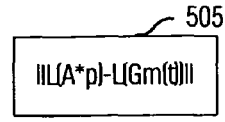
FIGS. 5a through 5d are diagrams of exemplary quality measure computations, according to a preferred embodiment of the present invention.

With reference now to FIGS. 5a through 5d, there are shown diagrams illustrating exemplary quality measure computations of the intermediate color communication space color vector equivalent of the color vector t $(L(G_m(t)))$ and the intermediate color communication space color vector equivalent of the N-dimensional color vector p $(L(A*p))$, according to a preferred embodiment of the present invention. The diagram shown in FIG. 5a illustrates a quality measure computation wherein the computation takes into consideration how closely the N-dimensional color vector representation of the color vector t matches the color vector t. It is possible to determine how well the N-dimensional color vector representation of the color vector t matches the color vector t by computing a Euclidean distance (or some other distance calculation) of a difference between the two vectors, with the quality measure being expressible as $\|L(A*p)-L(Gm(t))\|$ (block 505). The Euclidean distance (or some other distance calculation) can be referred to as a requirement of the minimization performed by the algorithm 300 (FIG. 3). However, it is also often referred to as being an objective function of the minimization. For example, if T is the intermediate color communication space color vector equivalent of the color vector t and P is the intermediate color communication space color vector equivalent of one of the N-dimensional color vector representations of the color vector t, then the Euclidean distance of the difference of T−P can be expressed as:

$$dist = \|(T - P)\|^2$$
$$= \|Lum(T) - Lum(P)\|^2 + \|Chroma(T) - Chroma(P)\|^2 +$$
$$\|Hue(T) - Hue(P)\|^2$$

where, Lum(.), Chroma(.) and Hue(.) correspond to the luminance, chroma and hue descriptors of color vectors T and P. In addition to a simple difference calculation, the weights of a primary color(s) can be scaled to emphasize or de-emphasize the primary color(s).

Although the simple difference or scaled difference in the quality measure computation shown above can select an N-dimensional color vector p that is a very good representation of the color vector t, the quality measure does not take into consideration the amount of energy transferred between neighboring N-dimensional color vectors, $p_i$ and $p_j$. For example, in a display system that displays colors using pulse-width modulation (PWM), large changes in primary color energy can result in PWM noise, which can degrade image quality. Therefore, it is desired that successive N-dimensional color vectors should be selected so that a change in their primary color energy is minimized. This requirement can be added to the minimization used in selecting an N-dimensional color vector p representing a color vector t.

Figure 5B:
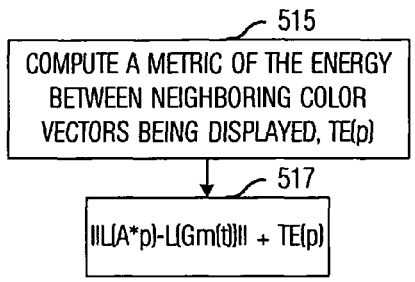

The diagram shown in FIG. 5b illustrates a quality measure computation wherein the computation includes a requirement that minimizes a change in primary color energy to help reduce PWM noise, which can degrade image quality. According to a preferred embodiment of the present invention, the computation of the quality measure includes a computation of a measure that can be representative of a transition between neighboring colors, $p_i$ and $p_{i+1}$ (block 515). An exemplary measure can be expressed as $$TE(p) = \lambda \sum_{j \in \aleph(p_i)} \|p_i - p_j\|,$$

where $\aleph(p_i)$ denotes a neighborhood immediately about color $p_i$ and $\lambda$ denotes a Lagrange multiplier that can be used as a parameter to set an importance of neighborhood consistency, functioning substantially as a scaling factor. Other scaling factors can be used in place of $\lambda$. In addition to considering a requirement that minimizes a change in primary color energy, as computed in block 515, the quality measure can also consider how closely the intermediate color communication space color vector representation of the color vector t matches the intermediate color communication space color vector representation of the N-dimensional representation of the color vector t (such as shown in FIG. 5a).

Therefore, the quality measure considers a first requirement that considers a change in primary color energy to help reduce PWM noise as well as a second requirement that will consider a difference between the N-dimensional color space representation of a color vector t (p) and the color vector t. The quality measure can be expressed as $\|L(A^*p) - L(Gm(t))\| + TE(p)$ (block 517). The quality measure can then be minimized to select N-dimensional color space representations of a color vector t that meet both the first requirement and the second requirement.

Figure 5C:
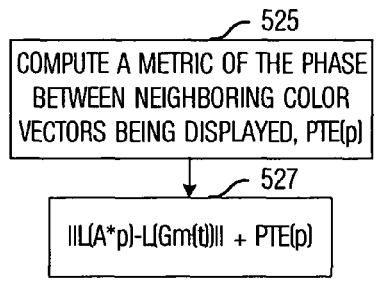

The diagram shown in FIG. 5c illustrates a quality measure computation wherein the computation includes a requirement that minimizes a change in a phase between neighboring color vectors. According to a preferred embodiment of the present invention, the computation of the quality measure includes a computation of a metric that can be representative of a phase transition between neighboring colors, $p_i$ and $p_{i+1}$ (block 525). An exemplary metric can be expressed as $$PTE(p) = \mu \sum_{j \in \aleph(p_j)} \exp(-p_i \cdot p_j),$$

where $\aleph(p_i)$ denotes a neighborhood immediately about color $p_i$ and $\mu$ denotes an additional Lagrange multiplier that can be used as a parameter to set an importance of phase consistency, functioning substantially as a scaling factor, with other scaling factors possible. In addition to considering a requirement that minimizes a change in primary color energy, as computed in block 525, the quality measure can also consider how closely the intermediate color communication space color vector representation of the color vector t matches the intermediate color communication space color vector representation of the N-dimensional representation of the color vector t (such as shown in FIG. 5a).

Therefore, the quality measure considers a first requirement that considers a change in phase as well as a second requirement that will consider a difference between the intermediate color communication space color vector representation of the color vector t matches the intermediate color communication space color vector representation of the N-dimensional representation of the color vector t. The quality measure can be expressed as $\|L(A^*p) - L(Gm(t))\| + PTE(p)$ (block 527). The quality measure can then minimized to select N-dimensional color space representations of a color vector t that meet both the first requirement and the second requirement.

Figure 5D:
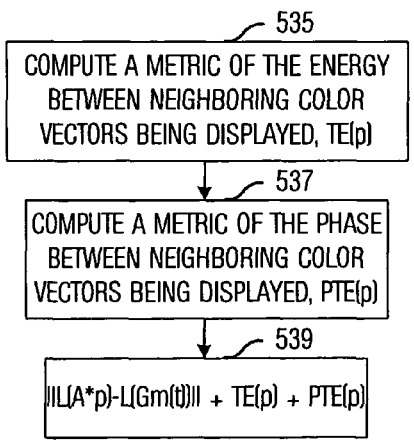

The diagram shown in FIG. 5d illustrates a quality measure computation wherein the computation includes requirements that minimize a change in primary color energy (block 535) and a change in a phase between neighboring color vectors (block 537). The quality measure also considers how closely the intermediate color communication space color vector representation of the color vector t matches the intermediate color communication space color vector representation of the N-dimensional representation of the color vector t. The quality measure can be expressed as $\|L(A^*p) - L(Gm(t))\| + TE(p) + PTE(p)$ (block 539). The quality measure can then minimized to select N-dimensional color space representations of a color vector t that meet all three requirements.

Figure 6:
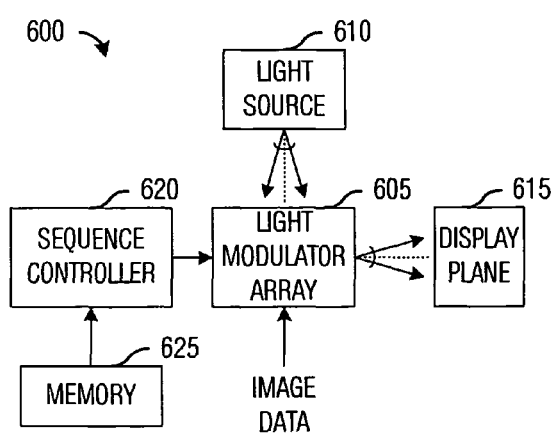
FIG. 6 is a diagram of a display system, according to a preferred embodiment of the present invention.

With reference now to FIG. 6, there is shown a diagram illustrating an exemplary display system 600, according to a preferred embodiment of the present invention. The display system utilizes an array of light modulators 605, wherein individual light modulators in the array 605 assumes a state corresponding to image data for an image being displayed by the display system 600. For example, in display systems where the light modulators in the array 605 are micromirror light modulators, then light from a light source 610 can be reflected away or towards a display plane 615. A combination of the reflected light from all of the light modulators in the array 605 produces an image corresponding to the image data.

A sequence controller 620 coordinates the loading of the image data into the array 605, controlling the light source 610, and so forth. The display system 600 also includes a memory 625 that can be used to store selected N-dimensional color vector representations of various input color vectors. Depending upon an input color vector, the sequence controller 620 can retrieve a selected N-dimensional color vector representation of the input color vector and use the selected N-dimensional color vector to display the input color vector. Since the selection of the N-dimensional color vector representations are made a priori and stored in the memory 625, the requirement for a sequence controller 620 with adequate processing power to make the selection in real-time can be relaxed. Multiple sets of selected N-dimensional color vector representations can be made and stored in the memory 625 to enable the use of optimally selected N-dimensional color vector representations under different operating conditions, such as different operating environments, chromatic characteristics of the light source 610, lighting conditions, display settings, and so on.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of creating a multiprimary lookup table, the method comprising:
   defining a set of color points, each represented by a data value for each of a first number of primary signals;
   selecting a color point from the set of color points;
   representing the color point by at least two unique converted color points, each converted color point having a data value for each of a second number of primary signals, wherein the second number is greater than the first number;
   computing a quality measure for the at least two unique converted color points, the quality measure influenced by additional converted color points representing similar color points;
   further selecting one converted color point for each color point based on the quality measure;
   repeating the selecting, representing, computing, and further selecting steps for each color point in the set of color points;
   storing the selected converted color points in a lookup table comprising a semiconductor memory array for converting the set of color points from a representation in terms of the first number of primary signals to a representation in terms of the second number of primary signals.

2. The method of claim 1, further comprising the step of converting the selected color point from to a point represented in a color space not represented by the first number of primary signals to produce an intermediate color space representation of the color point.

3. The method of claim 2, wherein the quality measure comprises computing a distance between the intermediate color space representation of the color point and the intermediate color space representation of the converted color point.

4. The method of claim 3, wherein the computed distance comprises a Euclidean or a perceptually weighted distance.

5. The method of claim 2, wherein the quality measure comprises computing an energy change between the intermediate color space representation of the converted color point and converted color points representing other color points.

6. The method of claim 5, wherein the computed energy change comprises computing a difference between the intermediate color space representation of the converted color point and converted color points representing other color points.

7. The method of claim 2, wherein the quality measure comprises computing a phase difference between the intermediate color space representation of the converted color point and converted color points representing other color points.

8. The method of claim 7, wherein the computed phase difference comprises computing a dot product between the intermediate color space representation of the converted color point and converted color points representing other color points.

9. The method of claim 2, wherein representing the color point comprises:
   mapping the color point into a desired rendition; and
   converting the desired rendition of the color signal into the intermediate color space representation.

10. The method of claim 2, wherein the intermediate color space is a perceptual color space.

* * * * *